United States Patent Office 3,211,610
Patented Oct. 12, 1965

3,211,610
BENZOIC ACID ESTER DERIVATIVES FOR TREATING COCCIDIOSIS AND METHOD OF USING SAME
Edward Franklin Rogers, Middletown, and Robert L. Clark, Woodbridge, N.J., assignors to Merck & Co., Inc., Rahway, N.J., a corporation of New Jersey
No Drawing. Filed Sept. 29, 1961, Ser. No. 143,998
21 Claims. (Cl. 167—53.1)

This invention relates to novel compositions for the treatment of poultry disease. More specifically, it relates to compositions useful in the management of the poultry disease coccidiosis. Still more specifically, it is concerned with animal feeds and feed supplements containing as an active anticoccidial agent certain 2-substituted-4-amino benzoic acids and derivatives thereof. It relates also to new compositions containing certain 2-substituted-4-amino benzoic acids or derivatives thereof and at least one other compound having anticoccidial activity.

This application is a continuation-in-part of our application Serial No. 87,117, filed February 6, 1961, now abandoned.

Coccidiosis is a common and widespread poultry disease caused by species of protozoan parasites of the genus Eimeria. The most important of these species are *E. maxima, E. acervulina, E. tenella, E. necatrix, E. brunetti, E. praecox* and *E. mitis*. In turkeys, *E. meleagridis* and *E. adenoides* are also causative organisms of coccidiosis. When left untreated, the severe forms of the disease lead to poor weight gain, reduced feed efficiency and high mortality. For these reasons, the control of coccidiosis is highly important to the poultry industry.

According to the present invention, it has been found that certain 2-substituted-4-amino benzoic acids and derivatives thereof are highly effective in the treatment and prevention of coccidiosis due to the protozoan parasites *E. maxima, E. praecox, E. mitis, E. acervulina* and *E. brunetti*. One object of the invention, therefore, is to provide novel compositions containing such compounds. Another object is provision of animal feed supplements and of animal feeds containing such compounds as active anticoccidial agents. A still further object is provision of water-soluble forms and aqueous solutions and suspensions of these 2-substituted-4-amino benzoic acid compounds, which compositions are suitable for administration of the substances to poultry by way of the drinking water. An additional object is the provision of new highly potent, broad spectrum anticoccidial compositions having as active ingredients a compound of Formula I hereinbelow and at least one other coccidiostat. Still another object is provision of a method of treating coccidiosis by administering to poultry minor amounts of the anticoccidial substances described herein. Other objects will become evident from the following discussion of the invention.

In accordance with the present invention, we have now found that compounds represented by the structural Formula I possess significant anticoccidial activity:

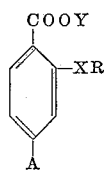

(I)

In this formula Y represents hydrogen, a hydrocarbon radical or a metal, X is oxygen or sulfur, R is lower alkyl or lower alkenyl, and A is amino, alkylamino or a radical that is convertible to amino or alkylamino on acid hydrolysis.

A significant feature of the anticoccidial compounds of this invention is the 2-substituent, i.e. the —XR grouping, since the type of substitution at this position of the molecule has an important effect on its anticoccidial activity. The benzoic acid compounds of the present invention have a lower alkoxy, a lower alkenyloxy, a lower alkylthio or a lower alkenylthio group in the 2-position. Thus X is oxygen or sulfur, and R is a lower alkyl or lower alkenyl radical such as methyl, ethyl, propyl, butyl, allyl or methallyl. In the preferred compositions R contains from 2–3 carbon atoms and X is oxygen.

The coccidiostats described herein also contain a free or esterified carboxy group. Thus, Y in Formula I above is hydrogen or a hydrocarbon radical. It is preferred that the hydrocarbon radical have less than nine carbon atoms. Thus, it may be a lower alkyl or alkenyl group such as methyl, ethyl, propyl, butyl, t-butyl, amyl, allyl, methallyl and like radicals, an aralkyl or aralkenyl group such as benzyl, cinnamyl, phenethyl and the like, or an aryl radical, an example of which is the phenyl groups. Salts of these benzoic acids are also within the purview of the invention, so that Y may be a metal, and preferably an alkali metal such as sodium or potassium, or an alkaline earth metal such as magnesium, barium or calcium.

The substituent at the 4-position of the 2,4-disubstituted benzoic acid compounds, i.e. A in Formula I, is an amino or alkylamino radical, or a group convertible thereto on acid hydrolysis. Examples of coccidiostats within our invention having an amino or alkylamino radical in the 4-position are methyl 2-ethoxy-4-amino benzoate, benzyl 2-allyloxy-4-amino benzoate, ethyl 2-ethylthio-4-amino benzoate, propyl 2-propylthio-4-amino benzoate, allyl 2-methoxy-4-amino benzoate, phenyl 2-propoxy-4-amino benzoate and similar substances wherein the 4-amino group is replaced by methylamino, ethylamino, dimethylamino, hydroxyethylamino, bis (hydroxyethyl) amino, γ-halopropylamino, allylamino, N-methyl-N-acylamino and like substituents. Thus, the amino group may be mono or dialkylated, and such alkyl radicals may be substituted as with hydroxy or halo groups.

In an additional and preferred embodiment of the invention, there are provided anticoccidial compositions containing a substance of Formula I wherein the 4-position of the 2-substituted benzoic acid compound contains a substituent that may be hydrolyzed to an amino or alkylamino radical with acid. Various substituents will, of course, vary in the ease with which they may be so hydrolyzed. It is believed that persons skilled in the art will consider as "hydrolyzable with acid" those groups which are convertible to an amino or alkylamino group on heating with about 6 N hydrochloric acid for them 3–4 hours. Therefore, in describing our invention we intend to include substances hydrolyzable under these or milder conditions. The preferred class of such substituents are acylamino radicals having the structure

where B represents a hydrocarbon radical. It is preferably an alkyl group such as methyl, ethyl, propyl, hexyl, an aryl moiety such as phenyl or naphthyl, or an aralkyl group, e.g. benzyl, phenylethyl, cinnamyl and the like.

Alternatively, B may be a heterocyclic ring such as furyl, thiazolyl, thienyl, pyridyl or pyrryl. Examples of suitable 4-acylamino groups are, therefore, acetylamino, propionoylamino, benzoylamino, cinnamoylamino, furoylamino, thenoylamino, diacetylamino, diproprionoylamino, formylamino and haloacetylamino.

In addition to 4-acylamino-2-XR-benzoic acid and benzoic acid esters of the type just described, other functional moieties convertible to amino or alkylamino on acid hydrolysis may be present in the position para to the carboxylic acid function in the anticoccidial compounds of our invention. Typical examples of coccidiostats in this category are:

(a) Ureas, such as N-(3-ethoxy-4-carbethoxy)-N'-ethylurea

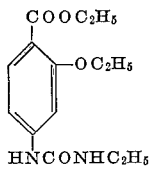

(b) Carbanilides or thiocarbanilides, such as 3-ethylthio-4-carbopropoxy-4'-chlorocarbanilide

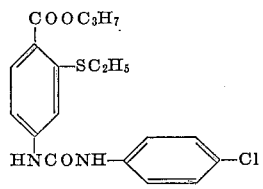

and 3-methoxy-4-carboxythiocarbanilide

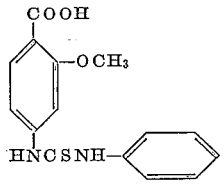

(c) Carbamates, such as 2-allyloxy-4-carboethoxyamino benzoic acid

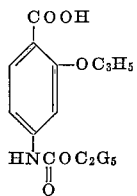

(d) Guanidines, such as 2-ethylthio-4-guanidino benzoic acid

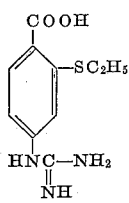

(e) Sulfonylamino compounds, such as ethyl 2-ethoxy-4-methanesulfonylamino benzoate

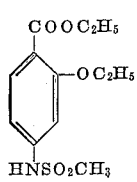

(f) Sulfonamides, such as 2-ethoxy-4-benzenesulfonamido benzoic acid

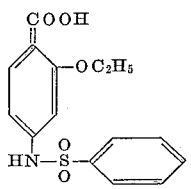

(g) Sulfinylamino compounds, such as benzyl 2-ethoxy-4-(phenylsulfinylamino)-benzoate

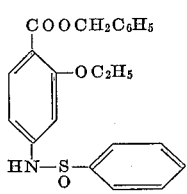

(h) Lower alkylidenylamino compounds, such as 2-ethoxy-4-ethylidenylamino benzoic acid

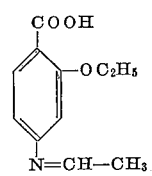

It will be appreciated from the foregoing discussion and from an inspection of the large group of 2,4-disubstituted benzoic acid compounds set forth in Example 1 that the nature of the 4-substituent of our compounds is not critical to anticoccidial activity as long as it is one that may be converted to an amino or an alkylamino group on acid hydrolysis. Every compound within the purview of the invention does not, of course, have the same degree of anticoccidial efficacy, but all are highly active, and the preferred 2-ethoxy-4-amino and 2-ethoxy-4-acylamino benzoic acids and esters are extremely potent anticoccidial agents.

The synthesis of certain of the compounds of Formula I above appears in the chemical literature. Those 2-XR-4-amino benzoic acids and the derivatives thereof, where —XR is as defined above, which have not heretofore been described in the literature may be produced by the methods of the detailed examples appearing below. One convenient method of introducing the 2-lower alkoxy or 2-lower alkenyloxy substituent is by esterification of p-amino salicylic acid and acylation of the resulting ester to produce a lower alkyl-p-acylamino salicylate, followed by alkylation or alkenylation of the 2-hydroxy group. Finally, if desired, the ester function and acylradical are removed by known methods. For synthesis of a 2-alkylthio or alkenylthio-4-amino benzoic acid, it is preferred to alkylate or alkenylate a lower alkyl-2-mercapto-4-nitro benzoate, after which the nitro group is reduced to an amino group, and the lower alkyl ester hydrolyzed. The substances of Formula I above wherein Y is hydrogen and A represents —NH₂ may, of course, be esterified and/or acylated by methods known to those skilled in the art.

In accordance with the invention, it has been discovered that the compounds of Formula I above are highly effective for the treatment or prevention of coccidiosis. For this purpose, they are administered to poultry as a component of the feed or the drinking water of the birds. According to one aspect of the invention, novel compositions are provided in which such compounds are present as an active anticoccidial ingredient, Such compositions comprise the 2-substituted-4-amino benzoic acids, or the above-described derivatives thereof, intimately dispersed in or admixed with an inert carrier or diluent. By an inert carrier is meant one that is essentially nonreactive with the active anticoccidial ingredient and that may be administered with safety to the animals. In the case of solid compositions, the carrier or diluent is preferably one that is orally ingestible and that is or may be an ingredient of the animal feed. Preferred drinking water formulations are water-soluble powders, aqueous suspensions, or solutions.

The compositions which are one of the preferred features of the invention are feed supplements in which the active anticoccidial ingredient is present in relatively large amounts in a poultry feed additive. Diluents which are normally employed for these animal feed supplements are solid orally ingestible poultry feed additives such as distillers' dried grains, corn meal, citrus meal, fermentation residues, wheat middlings, corn gluten feed, ground oyster shells, Attapulgus clay, wheat shorts, molasses solubles, corn cob meal, edible vegetable substances, toasted dehulled soya flour, soybean mill feed, antibiotic mycelia, soya grits, crushed limestone and the like. For the compositions of this invention, cereal or vegetable type carriers are preferred. These supplements are incorporated in the poultry feed either directly or after an intermediate dilution or blending step.

Certain of the 2-loweralkoxy-4-amino benzoic acids and 2-loweralkylthio-4-amino benzoic acids described hereinabove have some acid sensitivity so that care should be taken with such materials to select a carrier or diluent that does not cause excessive decomposition of the coccidiostat. It is preferred to buffer acidic carriers with a small amount of a base such as sodium carbonate when they are to be used with those anticoccidial agents which are acid sensitive. For example, wheat middlings buffered with a small amount of sodium carbonate is a suitable carrier for 2-ethoxy-4-amino benzoic acid. Nonacidic diluents such as oyster shell and crushed limestone may, of course, be employed without risk of decomposition of active ingradient. Poultry feed additives such as corn meal and corn gluten feed are also satisfactory diluents. The esters and N-acyl compounds do not possess this acid sensitivity, and for this reason are preferred over the free 2-substituted-4-amino benzoic acids since they may be formulated into feed supplements without serious risk of decomposition.

The 2-substituted-4-amino benzoic acid compounds of Formula I are intimately dispersed or blended throughout the solid inert carrier by methods such as grinding, stirring, milling or tumbling. The active compound is normally dispersed or mixed uniformly in the diluent but in some instances may be sorbed on the carrier. The desired concentration of coccidiostat is achieved by selecting proper diluents and by altering the ratio of carrier to active ingredient. Animal feed supplement formulations containing from about 0.03% to about 40% by weight, and preferably from about 0.04–20% by weight, of a 2-XR-4-amino benzoic acid compound are particularly suitable for addition to poultry feeds. The optimal concentration of coccidiostat in these feed supplements will depend to some extent on the particular compound employed. Since it is convenient for the feed manufacturer to use about 1–5 pounds of feed supplement for each ton of finished feed, the preferred concentration of any one of these coccidiostats in the supplement is also to a large extent a function of the desired level of active ingredient in the finished feed. With 2-ethoxy(or 2-allyloxy)-4-amino benzoic acid compounds, most of which are highly active against the *E. maxima* species of coccidia at feed levels of less than 0.001% by weight, feed supplements containing from about 0.04–2.4% by weight of anticoccidial agent are very satisfactory.

Examples of typical feed supplements containing a 2-substituted-4-amino benzoic acid, or ester thereof, (i.e. a compound of Formula I above) dispersed in a solid inert carrier are:

A

| | Lbs. |
|---|---|
| 2-ethoxy-4-amino benzoic acid | 0.5 |
| Wheat standard middlings | 98.5 |
| Sodium carbonate | 1.0 |

B

| | |
|---|---|
| 2-ethylthio-4-amino benzoic acid | 1.0 |
| Wheat standard middlings | 98.0 |
| Sodium carbonate | 1.0 |

C

| | |
|---|---|
| 2-allyloxy-4-amino benzoic acid | 2.0 |
| Crushed limestone | 98.0 |

D

| | |
|---|---|
| Ethyl 2-ethoxy-4-amino benzoate | 5.0 |
| Corn distillers' grains | 95.0 |

E

| | |
|---|---|
| 2-ethoxy-4-acetamido benzoic acid | 10.0 |
| Wheat standard middlings | 88.5 |
| Sodium carbonate | 1.5 |

F

| | |
|---|---|
| Methyl 2-ethoxy-4-acetamido benzoate | 2.0 |
| Corn germ meal | 48.0 |
| Corn distillers' grains | 50.0 |

G

| | |
|---|---|
| 2-ethoxy-4-amino benzoic acid | 0.04 |
| Sodium carbonate | 1.96 |
| Wheat middlings | 98.0 |

H

| | |
|---|---|
| Methyl 2-ethoxy-4-acetamido benzoate | 0.8 |
| Corn gluten feed | 98.2 |

I

| | |
|---|---|
| 2-ethoxy-4-benzamido benzoic acid | 1.5 |
| Corn meal | 60.0 |
| Corn gluten feed | 38.5 |

J

| | |
|---|---|
| 3-ethoxy-4-carboxythiocarbanilide | 10.0 |
| Ground oyster shell | 90.0 |

K

| | |
|---|---|
| 2-ethylthio-4-furoylamino benzoic acid | 15.0 |
| Corn germ meal | 40.0 |
| Corn distillers' grains | 45.0 |

L

| | |
|---|---|
| Benzyl 2-ethoxy-4-acetamido benzoate | 2.0 |
| Soybean meal | 90.0 |
| Fat | 8.0 |

These and similar feed supplements are prepared by intimately mixing the benzoic acid compound with the carrier or carriers as described above.

The feed supplements of the type illustrated are usually further diluted with feed ingredients such as corn meal or soybean meal before being incorporated in the animal feed. In this intermediate processing step the level of coccidiostat is reduced, thus facilitating uniform distribution of the substance in the finished feed which is a nutritionally adequate one normally containing a source of fat, protein, carbohydrate, minerals, vitamins and other nutritional factors.

The amount of 2-substituted-4-amino benzoic acid compound required for optimum control coccidiosis infections in poultry will, of course, vary somewhat with the specific compound or compounds employed and the severity of the infection. The compounds of Formula I above are effective against *E. maxima* when incorporated in the feed or drinking water in very minor amounts. With certain of the preferred compounds of the invention, and particularly with 2-ethoxy-4-amino benzoic acid, 2-ethoxy-4-acylamino benzoic acid, and the lower alkyl esters thereof, good prophylactic results are obtained by administering the drugs at levels of from about 0.0001% to about 0.001% by weight in the feedstuff. Generally, feed levels of from about 0.0002% to 0.0075% by weight of active ingredient are suitable with the compounds of our invention from the standpoint of coccidiosis control. Higher levels, e.g. up to about 0.035%, preferably to about 0.03% by weight in feed, may be used if desired, although these and even higher dosages are more frequently employed when using the compounds therapeutically for relatively short periods of time. It is desirable to employ the lowest levels that afford fully adequate control of coccidiosis in order to eliminate as far as possible any risk of side effects that might appear on prolonged feeding of the compounds.

As previously mentioned, the 2-substituted-4-amino benzoic acid compounds of Formula I may also be administered to poultry by way of the drinking water of the birds. When this route is used for prevention of coccidiosis, the treatment levels in the water are generally about one-half of those that would be used in a solid feedstuff since the birds drink about twice as much as they eat. This method of treatment is advantageously employed in the therapeutic use of the compounds since poultry infected with coccidiosis consume less solid feed than normal healthy birds. The compounds may be added directly to the drinking water or, alternatively, water-soluble powders may be prepared, in which the coccidiostat is intimately admixed with a suitable carrier, such as dextrose or sucrose, and these powders added to the drinking water of poultry as necessary. Such water-soluble powders may contain any desired concentration of coccidiostat, and preparations containing from about 0.1–20% by weight of active compound are suitable. When the coccidiostats described herein are to be used in drinking water, it is preferred to employ a water-soluble salt rather than the free acid, since the tendency of the acid to decomposition is thereby avoided. For this purpose, alkali metal salts such as sodium or potassium salts or alkaline earth metal salts such as the calcium and magnesium salts are preferred.

In accordance with an additional embodiment of this invention, novel and highly effective, broad spectrum anticoccidial compositions are provided by mixing the 1-OR-(or 2-SR)-4-amino benzoic acid compounds of Formula I above with one or more other anticoccidial agents which are primarily effective as prophylactic agents and which possess their highest degree of efficacy against such species of coccidia as *E. tenella* and *E. necatrix*. The compounds of Formula I are primarily effective against *E. maxima* and *E. brunetti* and to a significant degree against *E. acervulina*. With such combinations, therefore, it is possible to achieve very effective control of mixed coccidial infections. Surprisingly, it has been found that the activity of such mixtures is greater than would be expected if each component were merely exerting its own normal effect. It is thus possible to achieve optimum results with much smaller amounts of each coccidiostat than if only one member of the mixture was used alone.

Among the coccidiostats developed for prophylactic use and active primarily against *E. tenella* and *E. necatrix*, there may be mentioned 2-methyl-3,5-dinitrobenzamide, nicarbazin, glycarbylamide, 3,5-dinitrobenzamide, methiotriazamine - bithionol mixtures, 1 - (2 - loweralkyl - 4 - amino - 5 - pyrimidinylmethyl) - 2 - methyl pyridinium quaternary salts and 1 - (2 - loweralkyl - 4 - amino - 5 - pyrimidinylmethyl) - 4 - methyl pyridinium quaternary salts such as 1 - (2 - n - propyl - 4 - amino - 5 - pyrimidinylmethyl)-2-methyl pyridinium chloride, hydrochloride (amprolium), and 1 - (2 - n - propyl - 4 - amino - 5 - pyrimidinylmethyl)-4-methyl pyridinium chloride hydrochloride. All or any of these as well as others not given in this representative listing may be combined with the benzoic acid derivatives of Formula I to give highly potent coccidiostat compositions.

As an illustration of this aspect of the invention, it has been found that mixed infections of five species of coccidia (*E. tenella, E. necatrix, E. brunetti, E. acervulina* and *E. maxima*) are not satisfactorily controlled by feeding the infected chickens a diet containing 0.01% by weight of 2-ethoxy-4-amino benzoic acid. They are controlled with a diet containing 0.0125% by weight of amprolium. However, the administration of a poultry feed containing 0.0002% by weight of 2-ethoxy-4-amino benzoic acid (or an equimolar amount of 2-ethoxy-4-benzamido benzoic acid, methyl 2-ethoxy-4-amino benzoate or methyl 2-ethoxy-4-acetamido benzoate) and 0.003–0.006% by weight of amprolium affords substantially complete protection against the mixed coccidial infection. Poultry feeds containing from about 0.0002% to 0.0008% by weight of methyl 2-ethoxy-4-acetamido benzoate and from about 0.004% to about 0.025% by weight of amprolium or 2-methyl-3,5-dinitrobenzamide represent preferred embodiments of this aspect of the invention.

In practicing the aspect of our invention wherein a 2-substituted-4-amino benzoic acid compound of Formula I above and a minor amount of a second coccidiostat effective primarily against *E. tenella* are both incorporated in a poultry feedstuff, good results are obtained by employing at least about 0.00005% to 0.0001% by weight of benzoic acid compound, and from about 5–300 parts by weight of second coccidiostat per part of benzoic acid compound. Compositions containing from about 0.0001% to about 0.012% by weight of benzoic acid compound and at least about 0.0005% by weight of second coccidiostat are quite suitable. Normally the weight ratio of second coccidiostat to the 2-substituted-4-amino benzoic acid compound will decrease as the feed concentration of the latter substance increases. Thus, it is preferred to employ feed levels of 2-ethoxy-4-amino benzoic acid or lower alkyl 2-ethoxy-4-acylamino benzoates of about 0.0002–0.001% by weight, and about 5–100 parts of second coccidiostat per part of benzoic acid derivative. Such combinations of two or more coccidiostats are preferably utilized by preparing feed supplements containing the plurality of drugs, and incorporating these supplements in the finished feed. The typical feed supplements described above are suitable, a portion of the carrier being replaced by the desired quantity of second coccidiostat. Additional representative examples are:

| (1) | Lbs. |
|---|---|
| Methyl 2-ethoxy-4-acetamido benzoate | 1.0 |
| 1 - (2 - n - propyl - 4 - amino - 5 - pyrimidinylmethyl) - 2 - methyl pyridinium chloride hydrochloride | 25.0 |
| Corn gluten feed | 74.0 |

(2)

| | Lbs. |
|---|---|
| Ethyl 2-ethoxy-4-benzamido benzoate | 1.5 |
| 2-methyl-3,5-dinitrobenzamide | 25.0 |
| Soybean meal | 69.5 |
| Fat | 4.0 |

(3)

| | |
|---|---|
| Methyl 2-ethoxy-4-amino benzoate | 0.2 |
| 1-(2-n-propyl-4-amino-5-pyrimidinyl methyl)-4-methyl pyridinium chloride hydrochloride | 6.25 |
| Corn gluten feed | 93.55 |

A typical drinking water formulation contains methyl 2-ethoxy-4-acetamido benzoate, 0.3%; 1-(2-n-propyl-4-amino-5-pyrimidinylmethyl)-2-methyl pyridinium chloride hydrochloride, 9.6%; propylene glycol, 50.0%; dimethylpolysiloxane, 0.002%; polyoxyethylene sorbitan monoleate, 0.2%; water, to 100%. Another typical poultry feed additive composition contains 0.4–1.2% by weight of methyl 2-ethoxy-4-acetamido benzoate and 15–30% by weight of amprolium.

The following examples are given for the purpose of illustration and not by way of limitation:

*Example 1*

Anticoccidial activity of the 2-substituted-4-amino benzoic acid compounds described herein was determined in the following manner:

Straight run White Leghorn chicks, in groups of three each, were weighed and placed in cages with wire floors. They were fed ad libitum a standard laboratory ration in which graded concentrations of test compounds were blended just prior to use. Normal and infected control birds were fed basal ration containing no test compound. On the second day of the test the chicks were inoculated orally with 100,000 sporulated oocysts of *Eimeria maxima*. On the sixth day after inoculation all surviving birds were sacrificed and weighed. The small intestines were pooled in water and homogenized in a blender. Two aliquots of the homogenate were examined for oocysts in a hemocytometer. If the total count of oocysts was less than 30, the compound was rated as active.

The compounds listed below were active at the dose levels shown:

| Compound: | Dose level (percent by wt. in feed) |
|---|---|
| 2-methoxy-4-amino benzoic acid | 0.001 |
| 2-methoxy-4-acetamido benzoic acid | 0.003 |
| 2-ethoxy-4-amino benzoic acid | 0.0001 |
| 2-n-propoxy-4-amino benzoic acid | 0.001 |
| 2-allyloxy-4-amino benzoic acid | 0.00025 |
| 2-allyloxy-4-acetamido benzoic acid | 0.0005 |
| Methyl 2-allyloxy-4-acetamido benzoate | 0.0005 |
| 2-methylthio-4-amino benzoic acid | 0.003 |
| 2-methylthio-4-acetamido benzoic acid | 0.003 |
| 2-ethylthio-4-amino benzoic acid | 0.0005 |
| Ethyl 2-ethoxy-4-amino benzoate | 0.0001 |
| Methyl 2-ethoxy-4-amino benzoate | 0.0001 |
| 2-ethoxy-4-acetamido benzoic acid | 0.0001 |
| 2-ethoxy-4-propionoylamino benzoic acid | 0.00025 |
| 2-ethoxy-4-butylidenylamino benzoic acid | 0.0005 |
| 2-ethoxy-4-methylamino benzoic acid | 0.00025 |
| 2-ethoxy-4-butyrylamino benzoic acid | 0.001 |
| Methyl 2-ethoxy-4-acetamido benzoate | 0.0001 |
| 3,3'-dimethoxy-4,4'-dicarboxycarbanilide | 0.003 |
| 2-ethoxy-4-benzamido benzoic acid | 0.00025 |
| 2-ethoxy-4-formamido benzoic acid | 0.00025 |
| Methyl 2-ethoxy-4-benzamido benzoate | 0.0001 |
| Ethyl 2-ethoxy-4-acetamido benzoate | 0.0001 |
| Methyl 2-ethoxy-4-(4'-nitrobenzoylamino)-benzoate | 0.0005 |
| Benzyl 2-ethoxy-4-acetamido benzoate | 0.00025 |
| 3-ethoxy-4-carboxy-3',4'-dichlorocarbanilide | 0.003 |
| N-(3-ethoxy-4-carboxyphenyl)-N'-ethylurea | 0.0005 |
| 2-ethoxy-4-carbamido benzoic acid | 0.003 |
| 2-ethoxy-4-dimethylamino benzoic acid | 0.0001 |
| 2-ethoxy-4-dichloroacetylamino benzoic acid | 0.003 |
| 2-ethoxy-4-phenylacetylamino benzoic acid | 0.0001 |
| 2-ethoxy-4-phthalamido benzoic acid | 0.003 |
| 2-ethoxy-4-ethylamino benzoic acid | 0.00025 |
| 2-ethoxy-4-lauroylamino benzoic acid | 0.0005 |
| N-acetamido-2-ethoxy-4-ethylamino benzoic acid | 0.001 |
| Methyl 2-allyloxy-4-amino benzoate | 0.0005 |
| Methyl 2-ethoxy-4-cinnamoylamino benzoate | 0.00025 |
| 2-ethoxy-4-carbethoxyamino benzoic acid | 0.0001 |
| 3-ethoxy-4-carboxy thiocarbanilide | 0.003 |
| 3-ethoxy-4-carboxy-4'-fluorothio carbanilide | 0.003 |
| 3-ethoxy-4-carboxy-4'-nitrocarbanilide | 0.003 |
| 2-ethoxy-4-furoylamino benzoic acid | 0.00025 |
| 2-ethoxy-4-trimethylacetamido benzoic acid | 0.00025 |

*Example 2*

When tests were conducted with the *E. brunetti* species of coccidia, utilizing the procedure of Example 1, the following results were obtained:

| Compound: | Effective dose level (percent by wt. in feed) |
|---|---|
| 2-methylthio-4-amino benzoic acid | 0.001 |
| 2-ethylthio-4-amino benzoic acid | 0.00025 |
| 2-ethoxy-4-amino benzoic acid | 0.00025 |
| 2-methoxy-4-amino benzoic acid | 0.0005 |

*Example 3*

When the experiment of Example 1 was conducted using oocysts of *E. acervulina* as the source of infection, activity was found with the following compounds at the dose levels indicated:

| Compound: | Effective dose level (percent by wt. in feed) |
|---|---|
| 2-methoxy-4-amino benzoic acid | 0.001 |
| 2-ethoxy-4-amino benzoic acid | 0.001 |
| 2-n-propoxy-4-amino benzoic acid | 0.001 |
| 2-i-propoxy-4-amino benzoic acid | 0.005 |
| 2-methylthio-4-amino benzoic acid | 0.003 |
| Ethyl 2-ethoxy-4-amino benzoate | 0.005 |
| Methyl 2-ethoxy-4-amino benzoate | 0.0005 |

*Example 4*

The coccidiostatic activity of 2-ethoxy-4-amino benzoic acid and 2-ethoxy-4-acetylamino benzoic acid alone and mixed with amprolium against a mixed coccidial infection was determined by the following method:

Groups of ten two-week old White Leghorn chicks were fed a mash diet containing various amounts of the compounds. The compounds were uniformly dispersed in the feed. After having been on this ration for 24 hours, each chick was inoculated with 50,000 sporulated oocysts each of *E. tenella, E. necatrix, E. maxima, E. acervulina* and *E. brunetti*.

Other groups of ten chicks each were fed a similar mash diet which contained no coccidiostat. These were also infected in the same manner after 24 hours and served as positive or infected controls. As positive controls, two to four groups of ten chicks each were employed. Still other groups of ten chicks each were fed the mash free of coccidiostat and were not infected with coccidiosis. These served as normal controls.

The diets were administered to the chicks for eight days following the date of infection. At the end of this time the infected birds still living were sacrificed. The oocyst count was determined by a microscopic examination of the cecal and intestinal homogenates.

The results employing the indicated amounts of coccidiostat compound, and expressed as mean values, are set forth below:

| Compound | Percent Compound In Feed | Percent Mortality | Percent Weight Gain | No. of Oocysts $\times 10^{-6}$ In Surviving Animals |
|---|---|---|---|---|
| Infected Controls | | 100 | | |
| Normal Controls | | 0 | 85 | |
| Amprolium | 0.003 | 0 | 24 | 33 |
| | 0.006 | 0 | 43 | 35 |
| | 0.0125 | 0 | 59 | 31 |
| | 0.025 | 0 | 53 | 22 |
| 2-ethoxy-4-amino benzoic acid | 0.00025 | 100 | | |
| | 0.0005 | 100 | | |
| | 0.001 | 80 | 13 | 95 |
| Amprolium+2-ethoxy-4-amino benzoic acid | 0.003 +0.00025 | 0 | 52 | 4 |
| | 0.006 +0.00025 | 0 | 77 | 0.5 |
| | 0.0125+0.00025 | 0 | 82 | <0.1 |
| | 0.003 +0.0005 | 0 | 66 | 5 |
| | 0.006 +0.0005 | 0 | 81 | <0.1 |
| | 0.0125+0.0005 | 0 | 80 | <0.1 |
| | 0.003 +0.001 | 0 | 73 | 4 |
| | 0.006 +0.001 | 0 | 82 | <0.1 |
| | 0.0125+0.001 | 0 | 88 | <0.1 |

In other experiments carried out as described above against a mixed infection of the five species of coccidia, the following results were obtained:

| Compound | Percent Compound In Feed | Percent Mortality | Percent Weight Gain | No. of Oocysts $\times 10^{-6}$ In Surviving Animals |
|---|---|---|---|---|
| 2-ethoxy-4-acetylamino benzoic acid | 0.00012 | 40 | 29 | 10 |
| | 0.00036 | 30 | 28 | 38 |
| Amprolium | 0.003 | 0 | 72 | 2 |
| | 0.006 | 0 | 67 | 0.3 |
| | 0.0125 | 0 | 70 | <0.1 |
| | 0.025 | 0 | 76 | <0.1 |
| Amprolium+2-ethoxy-4-acetylamino benzoic acid | 0.003 +0.00012 | 0 | 68 | 2 |
| | 0.006 +0.00012 | 10 | 78 | 0.8 |
| | 0.0125+0.00012 | 10 | 71 | 0.2 |
| | 0.003 +0.00036 | 0 | 81 | 1 |
| | 0.006 +0.00036 | 0 | 78 | 1 |
| | 0.0125+0.00036 | 0 | 84 | <0.1 |
| 2-ethoxy-4-amino benzoic acid | 0.0001 | 50 | 21 | 46 |
| | 0.0003 | 50 | 23 | 39 |
| 2-methyl-3,5-dinitrobenzamide | 0.003 | 0 | 47 | 15 |
| | 0.006 | 0 | 59 | 4 |
| | 0.0125 | 0 | 64 | 0.7 |
| 2-methyl-3,5-dinitrobenzamide+2-ethoxy-4-amino benzoic acid | 0.006 +0.0003 | 0 | 88 | 2 |
| | 0.0125+0.0003 | 0 | 90 | 0.4 |
| Nicarbazin | 0.003 | 0 | 32 | 6 |
| | 0.006 | 0 | 62 | 10 |
| | 0.0125 | 0 | 80 | 1 |
| Nicarbazin+2-ethoxy-4-amino benzoic acid | 0.006 +0.0003 | 0 | 80 | 6 |
| | 0.0125+0.0003 | 0 | 73 | <0.1 |
| Unistat [1] | 0.05 | 10 | 38 | 22 |
| | 0.01 | 0 | 53 | 1 |
| | 0.2 | 0 | 49 | 0.2 |
| Unistat+2-ethoxy-4-amino benzoic acid | 0.05 +0.0003 | 0 | 71 | 14 |
| | 0.1 +0.0003 | 0 | 85 | 0.4 |
| Infected Controls | | 47 | 16 | 20 |
| Normal Controls | | 0 | 88 | |

[1] Unistat is the trademark of Dr. Salsbury's Laboratories for a mixture of dinitro-benzamide, acetyl-(p-nitrophenyl)-sulfanilamide and 3-nitro-4-hydroxyphenyl arsonic acid.

*Example 5*

Experiments were conducted to test the effectiveness of 2-ethoxy-4-amino benzoic acid, alone and mixed with amprolium, against *E. acervulina* infections. These were carried out by the procedure described in Example 4, except that each chick was inoculated with 200,000 oocysts of *E. acervulina*, and the diets fed for six days following the date of infection. The results are set forth below:

| Compound | Percent Compound In Feed | Percent Mortality | Percent Weight Gain | No. of Oocysts $\times 10^{-6}$ In Surviving Animals |
|---|---|---|---|---|
| Amprolium | 0.003 | 0 | 59 | 0.2 |
| | 0.006 | 0 | 73 | 0.1 |
| | 0.0125 | 0 | 77 | <0.1 |
| | 0.025 | 0 | 101 | <0.1 |
| 2-ethoxy-4-amino benzoic acid | 0.0003 | 0 | 44 | 0.4 |
| | 0.001 | 0 | 64 | <0.1 |
| | 0.003 | 0 | 64 | <0.1 |
| | 0.01 | 0 | 69 | <0.1 |
| Amprolium + 2-ethoxy-4-amino benzoic acid | 0.003+0.0003 | 0 | 80 | <0.1 |
| | 0.006+0.0003 | 0 | 82 | <0.1 |
| | 0.003+0.001 | 0 | 75 | <0.1 |
| | 0.006+0.001 | 0 | 95 | <0.1 |
| Infected Controls | | 0 | 39 | 1.5 |
| Normal Controls | | 0 | 79 | |

Example 6

(A) When experiments the same as those of Example 5 were conducted, except that the birds were inoculated with 100,000 oocysts of *E. maxima*, the following results were obtained:

| Compound | Percent Compound In Feed | Percent Mortality | Percent Weight Gain | No. of Oocysts $\times 10^{-6}$ In Surviving Animals |
|---|---|---|---|---|
| Amprolium | 0.003 | 0 | 69 | 0.8 |
|  | 0.006 | 0 | 68 | 0.7 |
|  | 0.0125 | 0 | 61 | 0.3 |
|  | 0.025 | 0 | 74 | <0.1 |
| 2-ethoxy-4-amino benzoic acid | 0.0003 | 0 | 85 | 0.1 |
|  | 0.001 | 0 | 93 | <0.1 |
|  | 0.003 | 0 | 90 | <0.1 |
|  | 0.01 | 0 | 92 | <0.1 |
| Amprolium+2-ethoxy-4-amino benzoic acid | 0.003+0.0003 | 0 | 93 | <0.1 |
|  | 0.006+0.0003 | 0 | 93 | <0.1 |
|  | 0.003+0.001 | 0 | 100 | <0.1 |
|  | 0.006+0.001 | 0 | 93 | <0.1 |
| Infected Controls |  | 0 | 47 | 3.0 |
| Normal Controls |  | 0 | 86 |  |

(B) In experiments conducted in the manner described in Example 6A, and using methyl 2-ethoxy-4-acetamido benzoate in place of 2-ethoxy-4-amino benzoic acid, the following results were obtained:

| Compound | Percent Compound In Feed | Percent Mortality | Percent Weight Gain | No. of Oocysts $\times 10^{-6}$ In Surviving Animals |
|---|---|---|---|---|
| Amprolium | 0.006 | 0 | 51 | 5.0 |
|  | 0.0125 | 0 | 63 | 4.0 |
|  | 0.025 | 0 | 54 | 0.1 |
| Methyl 2-ethoxy-4-acetamino benzoate | 0.00004 | 0 | 47 | 8.0 |
|  | 0.0001 | 0 | 51 | 5.0 |
|  | 0.0004 | 0 | 76 | 3.0 |
|  | 0.001 | 0 | 72 | <0.1 |
| Amprolium+Methyl 2-ethoxy-4-acetamido benzoate | 0.006+0.00004 | 0 | 54 | 0.1 |
|  | 0.006+0.0001 | 0 | 67 | <0.1 |
|  | 0.006+0.0004 | 0 | 74 | <0.1 |
|  | 0.0125+0.00004 | 0 | 78 | <0.1 |
|  | 0.0125+0.0001 | 0 | 78 | <0.1 |
|  | 0.0125+0.0004 | 0 | 75 | <0.1 |
| Infected Controls |  | 0 | 38 | 10.0 |
| Normal Controls |  | 0 | 76 |  |

(C) In experiments similar to those described above using *E. mitis* as the infective parasite, the results were as follows:

| Compound | Percent Compound In Feed | Percent Mortality | Percent Weight Gain | No. of Oocysts $\times 10^{-6}$ In Surviving Animals |
|---|---|---|---|---|
| Amprolium | 0.006 | 0 | 46 | 32 |
|  | 0.0125 | 0 | 49 | 9 |
|  | 0.025 | 0 | 51 | 2.5 |
| Methyl 2-ethoxy-4-acetamide benzoate | 0.00004 | 0 | 29 | 80 |
|  | 0.0001 | 0 | 40 | 94 |
|  | 0.0004 | 0 | 46 | 7 |
|  | 0.001 | 0 | 60 | 0.1 |
| Amprolium+Methyl 2-ethoxy-4-acetamido benzoate | 0.006+0.00004 | 0 | 53 | 12 |
|  | 0.006+0.0001 | 0 | 54 | 15 |
|  | 0.006+0.0004 | 0 | 60 | 3.5 |
|  | 0.0125+0.00004 | 0 | 57 | 4 |
|  | 0.0125+0.0001 | 0 | 56 | 3 |
|  | 0.0125+0.0004 | 0 | 68 | <0.1 |
| Infected Controls |  | 0 | 27 | 87 |
| Normal Controls |  | 0 | 64 |  |

Example 7

2-METHYLTHIO-4-AMINO BENZOIC ACID 18 g. of 2-thiocyano-4-nitro benzoic acid are added to a solution of 22.4 g. of potassium hydroxide in 225 ml. of methanol. 15 ml. of methyl iodide is added, and the mixture heated with gentle refluxing for 12 hours. The hot solution is then filtered, concentrated to about one-half volume, and cooled. Crystals of 2-methylthio-4-nitro benzoic acid form, which are recovered by filtration and recrystallized from methanol, M.P. 216° C.

The 2-methylthio-4-nitro benzoic acid is dissolved in a minimum volume of ethanol, and reduced with hydrogen at substantially atmospheric pressure in the presence of a Raney nickel catalyst. On completion of the reduction, the catalyst is removed by filtration, and the filtrate evaporated to dryness in vacuo. The 2-methylthio-4-amino benzoic acid thus obtained is recrystallized from glacial acetic acid, M.P. 185° C. (dec.).

A mixture of 4 g. (0.022 m.) of 2-methylthio-4-amino benzoic acid in 40 ml. of pyridine and 4 ml. of acetic anhyride is stirred for five minutes until solution results. It is allowed to stand for 15 hours at room temperature, after which time the precipitate of 2-methyl-thio-4-acetamido benzoic acid is recovered by filtration. This product is crystallized from 40 ml. of methanol to give substantially pure material, M.P. 240–241° C.

*Example 8*

ETHYL-2-ETHYLTHIO-4-AMINO BENZOATE 2.0 g. of ethyl-2-ethylthio-4-nitro benzoate is dissolved in 20 ml. of ethanol and the solution treated with hydrogen at substantially atmospheric pressure in the presence of about 0.75 g. of platinum oxide catalyst. When hydrogen uptake ceases the catalyst is removed by filtration and the filtrate concentrated to dryness in vacuo to give substantially pure ethyl-2-ethylthio-4-amino benzoate.

*Example 9*

2-ETHOXY-4-METHYLAMINO BENZOIC ACID

To 9 g. of 2-ethoxy-4-acetamido benzoic acid methyl ester in 30 ml. of dioxane is added with stirring 1.6 g. of sodium hydride-mineral oil emulsion (50% sodium hydride) and, in a short time, 3 ml. of dimethyl sulfate. The resulting mixture is heated at 95° C. for 16 hours. To the resulting solution of methyl-2-ethoxy-N-acetyl-4-methylamino benzoate there is added 50 ml. of 2.5 N sodium hydroxide. The solution is heated on a steambath for about 30 minutes and the solvents then removed by evaporation under reduced pressure. The residual product is dissolved in water and the aqueous solution extracted with an equal volume of ether. The ether is separated and the aqueous layer acidified with hydrochloric acid. Upon acidification, N-acetyl-2-ethoxy-4-methylamino benzoic acid precipitates. On recrystallization from methanol, the product melts at 166–167° C.

2 g. of the N-acetyl compound obtained immediately above is heated in 25 ml. of 2.5 N sodium hydroxide solution at 100° C. for 3½ hours. The solution is then cooled and neutralized with dilute hydrochloric acid. The resulting precipitate of 2-ethoxy-4-methylamino benzoic acid is recovered by filtration and recrystallized from aqueous methanol to give substantially pure material, M.P. 115–116° C.

Other 2-alkoxy or 2-alkylthio-4-loweralkylamino benzoic acids are prepared by the procedure described above, using the appropriate alkylating agent in place of dimethylsulfate and the appropriate 2-alkoxy or 2-alkylthio-4-acetamido benzoic acid methyl ester. In this fashion, there are obtained 2-allyloxy-4-methylamino-benzoic acid, 2-ethylthio-4-ethylamino benzoic acid and 2-ethoxy-4-propylamino benzoic acid.

*Example 10*

METHYL-2-ETHOXY-4-AMINO BENZOATE

To a stirred mixture of 9 g. (0.050 m.) of 2-ethoxy-4-amino benzoic acid in 260 ml. of methanol is added 26 ml. (0.5 m.) of sulfuric acid. The resulting solution is heated under reflux for 17 hours. Most of the methanol is removed in vacuo with the temperature of the solution being held below 40° C. With stirring, the residue is made alkaline with 10% sodium carbonate solution. The resulting solid methyl-2-ethoxy-4-amino benzoate is removed by filtration. It is purified by crystallization from 40 ml. of hot methanol by the addition of 80 ml. of water, M.P. 102–104° C.

*Example 11*

METHYL-2-ALLYLOXY-4-AMINO BENZOATE

A suspension of 3.6 g. of 2-allyloxy-4-amino benzoic acid in 50 ml. of ether is treated with an ether solution of diazomethane. A few milliliters of ethanol is then added to dissolve any solid that is present. The mixture is allowed to stand at room temperature for 1 hour, during which time methyl-2-allyloxy-4-amino benzoate precipitates. This solid is removed and crystallized from 15 ml. of carbon tetrachloride to give substantially pure material, M.P. 84–85° C.

*Example 12*

(A) 2-ETHOXY-4-DICHLOROACETYLAMINO BENZOIC ACID

To a solution of 18.1 g. (0.1 m.) of 2-ethoxy-4-amino benzoic acid in 12 g. (0.3 m.) of sodium hydroxide and 150 ml. of water there is added, with rapid stirring and cooling, 16 g. (0.11 m.) of dichloroacetyl chloride in 35 ml. of ether. After stirring 1 hour the aqueous solution is filtered and acidified with acetic acid. The precipitated product is removed by filtration and crystallized from 375 ml. of ethyl acetate to give 2-ethoxy-4-dichloroacetyl-amino benzoic acid, M.P. 184–186° C.

(B) 2-ETHOXY-4-BENZAMIDO BENZOIC ACID

To a rapidly stirred solution of 18.1 g. (0.1 m.) of 2-ethoxy-4-amino benzoic acid in 100 ml. of water containing 8.4 g. (2.1 m.) of sodium hydroxide and cooled to 28° C. there is slowly added a solution of 14 g. (0.1 m.) of benzoyl chloride in 40 ml. of ether. After stirring for 30 minutes the mixture becomes cloudy and 4 g. (0.1 m.) of sodium hydroxide is added. After stirring for 2 hours, the clear aqueous solution is separated and diluted with 100 ml. of water. Hydrochloric acid is added to the aqueous solution with rapid stirring until the pH of the solution is less than 2. 2-ethoxy-4-benzamido benzoic acid separates and is crystallized from 250 ml. of boiling methanol to give substantially pure material, M.P. 180–183° C.

(C) 2-ETHOXY-4-FUROYLAMINO BENZOIC ACID

A solution of 13 ml. (0.1 m.) of furoyl chloride in 40 ml. of ether is added with stirring to a mixture of 18.1 g. (0.1 m.) of 2-ethoxy-4-amino benzoic acid, 8.6 g. (0.22 m.) of sodium hydroxide and 100 ml. of water. The ether boils and the solution becomes cloudy. 4 g. of sodium hydroxide is then added and the resulting solution stirred for 2 hours. It is then diluted with 100 ml. of water and the solution acidified with hydrochloric acid. 2-ethoxy-4-furoylamino benzoic acid precipitates and is recovered by filtration. It is crystallized from 30 ml. of methanol to give material melting at 159–160° C.

(D) 2-ETHOXY-4-DIACETAMINO BENZOIC ACID

A mixture of 1 g. of 2-ethoxy-4-amino benzoic acid, 5 ml. of acetic anhfdride and 2 drops of sulfuric acid is heated to 80° C. for 30 minutes. The solution is then added to an equal volume of boiling water. When the odor of acetic anhydride disappears the precipitate of 2-ethoxy-4-diacetamino benzoic acid is colleted by filtration and dried in vacuo.

(E) N,N'-MALONYL-BIS-(2-ETHOXY-4-AMINO BENZOIC ACID

To a solution of 18 g. of 2-ethoxy-4-amino benzoic acid in 100 ml. of water containing 16 g. of sodium hydroxide there is added, with rapid stirring, an ethereal solution of 7.5 g. of malonyl chloride. The resulting mixture is stirred for 2 hours and then acidified with acetic acid to precipitate N,N'-malonyl-bis-(2-ethoxy-4-amino benzoic acid). This substance is isolated by filtration and purified by crystallization from a small volume of methanol.

(F) 2-ETHOXY-4-TRIMETHYLACETAMIDO BENZOIC ACID

To a stirred solution of 18.1 g. of 2-ethoxy-4-amino benzoic acid in 100 ml. of water containing 8.6 g. of sodium hydroxide there is added 12 ml. of trimethylacetyl chloride in 40 ml. of ether. The temperature rises to 35° C. Sodium hydroxide is added until the solution remains basic. After 2 hours 100 ml. of water is added and then the solution is acidified with hydrochloric acid. The resulting solid 2-ethoxy-4-trimethylacetamido benzoic acid is separated by filtration. It is purified by crystallizing from 30 ml. of methanol by the addition of 30 ml. of water. It is finally recrystallized from methanol to give pure 2-ethoxy-4-trimethylacetamido benzoic acid, M.P. 166–167° C.

(G) METHYL-2-ETHOXY-4-CINNAMOYLAMINO BENZOATE

To a suspension of 5 g. of methyl-2-ethoxy benzoate in 200 ml. of ether is added, with rapid stirring, 4.5 ml. of cinnamoyl chloride and 1.5 g. of sodium hydroride in 7 ml. of water. After a short time methyl-2-ethoxy-4-cinnamoylamino benzoate separates as a solid. It is filtered off and crystallized from 35 ml. of methanol by the addition of 10 ml. of water to give substantially pure material, M.P. 143–144° C.

(H) N-ACETAMIDO-2-ETHOXY-4-ETHYLAMINO BENZOIC ACID 2.8 ml. of diethylsulfate is added to a mixture of 7.3 g. of 2-ethoxy-4-acetamido bendoic acid and 1.5 g. of 50% sodium hydride emulsion in 50 ml. of dioxane. The reaction mixture is heated with stirring at 100° C. for 18 hours. 50 ml. of 2.5 N NaOH is then added and the solution further heated for 10 minutes. The solution is cooled to room temperature, diluted with 100 ml. of water and extracted with 2 x 30 ml. of ether. The aqueous layer is separated, acidified, and cooled. N-acetyl-2-ethoxy-4-ethylamino benzoic acid precipitates and is filtered off. It is recrystallized from aqueous methanol to give pure material, M.P. 174–176° C.

(I) 2-ETHOXY-4-FORMAMIDO BENZOIC ACID

A solution of 5 g. of 4-amino-2-ethoxy benzoic acid in 20 ml. of 98% formic acid is heated for 2 hours at 50° C., then for 1 hour at 80° C. The reaction mixture is diluted with 80 ml. of water, cooled and the precipitate of 2-ethoxy-4-formamido benzoic acid filtered off and washed with water, M.P. 170–172° C.

(J) 2-ETHOXY-4-LAUROYLAMINO BENZOIC ACID 20 ml. of lauroyl chloride is added to a solution of 18.1 g. of 2-ethoxy-4-amino benzoic acid in 100 ml. of water containing 10 g. of sodium hydroxide. A precipitate appears and is removed by filtration. This material is dissolved in water and with rapid stirring the solution acidified with dilute hydrochloric acid. 2-ethoxy-4-lauroylamino benzoic acid precipitates. It is recovered by filtration and crystallized from ethyl acetate-petroleum ether to give substantially pure material, M.P. 100–102° C.

(K) 2-ETHOXY-4-PHTHALAMIDO BENZOIC ACID

To a solution of 18.1 g. of 2-ethoxy-4-amino benzoic acid in 100 ml. of water containing 12 g. of sodium hydroxide is added 14.8 g. of phthalic anhydride. The temperature rises to 45° C. After 1 hour the rapidly stirred solution is made acidic whereupon 2-ethoxy-4-phthalamido benzoic acid precipitates. The solid is removed and crystallized from 100 ml. of warm methanol by the addition of 150 ml. of water to give 2-ethoxy-4-phthalamido benzoic acid, M.P. 154–155° C.

(L) 2-ETHOXY-4-PHENYLACETYLAMINO BENZOIC ACID

A solution of 15.5 g. (0.1 m.) of phenylacetyl chloride in 25 ml. of ether is added over a period of 25 minutes to a rapidly stirred solution of 18.1 g. (0.1 m.) of 4-amino-2-ethoxy benzoate in 10 g. of sodium hydroxide in 150 ml. of water. The reaction mixture is stirred for another 20 minutes and then made acid with acetic acid. The oil which forms soon becomes solid and is purified by recrystallization from dimethylformamide-ether to give pure 2-ethoxy-4-phenylacetylamino benzoic acid, M.P. 194–195° C.

Example 13

BENZYL-2-ETHOXY-4-ACETAMIDO BENZOATE

To a stirred mixture of 5.6 g. of 2-ethoxy-4-acetamido benzoic acid, 70 ml. of benzene and 2.1 ml. of pyridine there is slowly added at 50° C. 1.9 ml. of thionyl chloride in 5 ml. of benzene. The temperature is then raised to 75° C. for 10 minutes. The mixture is cooled, 10 ml. of benzyl alcohol added and the mixture stirred for 30 minutes. The benzene is then removed by concentration in vacuo, water added and the top layer separated. This top layer is extracted with petroleum ether to remove benzyl alcohol. Benzyl-2-ethoxy-4-acetamido benzoate remains as a waxy solid. It is crystallized from ethyl acetate by the addition of petroleum ether and finally from ethyl acetate alone to give substantially pure material, M.P. 104–105° C.

Example 14

METHYL-2-ETHOXY-4-(4'-NITROBENZOYLAMINO)-BENZOATE

To a suspension of 1.95 g. of methyl-2-ethoxy-4-amino benzoate in 100 ml. of ether there is added, with rapid stirring, 1.85 g. of 4-nitrobenzoyl chloride and 0.4 g. of sodium hydroxide in 5 ml. of water. After stirring 2 hours the white precipitate is removed by filtration. It crystallizes from 15 ml. of dimethylformamide by the addition of 200 ml. of methanol to give methyl-2-ethoxy-4-(4'-nitrobenzoylamino)benzoate, M.P. 196–197° C.

Example 15

METHYL-2-ETHOXY-4-BENZOYLAMINO BENZOATE

To a suspension of 1.95 g. of methyl-2-ethoxy-4-amino benzoate in 80 ml. of ether there is added, with rapid stirring, 1.4 g. of benzoyl chloride and 0.4 g. of sodium hydroxide in 0.5 ml. of water. After stirring for 1 hour the ether layer is separated, washed with water, dried and evaporated to dryness to give a residue of methyl-2-ethoxy-4-benzoylamino benzoate. It is crystallized from 7 ml. of methanol to give pure product, M.P. 123–124° C.

Example 16

2-ETHOXY-4-DIMETHYLAMINO BENZOIC ACID

A mixture of 18.1 g. (0.1 m.) of 2-ethoxy-4-amino benzoic acid, 8 g. (0.2 m.) of sodium hydroxide and 30 g. (0.21 m.) of methyl iodide in 200 ml. of methanol is prepared and held at room temperature for 4 days. An additional 4 g. of sodium hydroxide is then added and the mixture refluxed for 1 hour. The methanol is then removed by concentration, and the residue redissolved in about 30 ml. of hot water and chilled. The sodium salt of 2-ethoxy-4-dimethylamino benzoic acid precipitates, and the solid is filtered off. It is redissolved in water and the solution neutralized with dilute hydrochloric acid whereupon 2-ethoxy-4-dimethylamino benzoic acid precipitates. This product is isolated by filtration and recrystallized from methanol to give pure acid, M.P. 129–130° C.

Example 17

2-ETHOXY-4-CARBOETHOXYAMINO BENZOIC ACID 9 g. (0.05 m.) of 2-ethoxy-4-amino benzoic acid is dissolved in a solution of 4.0 g. of sodium hydroxide in 50 ml. of water. To this stirred solution is added 5 ml. (0.05 m.) of ethyl chlorocarbonate in 20 ml. of ether. The temperature rises slightly and after 1 hour most of the ether has evaporated. The aqueous solution is acidified with hydrochloric acid whereupon 2-ethoxy-4-barboethoxyamino benzoic acid precipitates. It is isolated by filtering and crystallized from 60 ml. of absolute ethanol to give pure compound, M.P. 188–190° C.

Example 18

N-(3-ETHOXY-4-CARBOXY)-N'-ETHYLUREA

A hot solution of 13 g. of 4-amino-2-ethoxy benzoic acid in 125 ml. of dioxane and a solution of 8 g. of ethyl isocyanate in 100 ml. of benzene are mixed together and allowed to stand. After about 10 minutes N-(3-ethoxy-4-carboxy)-N'-ethylurea begins to crystallize. The product is separated by filtration and recrystallized from ethanol-petroleum ether to give pure product melting at 164° C. (dec.).

Example 19

(A) 3-ETHOXY-4-CARBOXY-3',4'-DICHLOROCARBANILIDE

A hot solution of 9 g. of 4-amino-2-ethoxy benzoic acid in 75 ml. of dioxane is added to a freshly filtered solution of 10 g. of 3,4-dichlorophenyl isocyanate in 200 ml. of benzene. A clear solution forms initially. After a short time 3-ethoxy-4-carboxy-3',4'-dichlorocarbanilide begins to crystallize. After 2 hours this product is collected by filtration and washed well with ether. It is purified by extraction with hot ethanol. It melts at 233° C. (dec.).

(B) 3-ETHOXY-4-CARBOXY-4'-FLUOROTHIOCARBANILIDE

To a warm solution of 15 g. of 2-ethoxy-4-amino benzoic acid in 100 ml. of dioxane and 15 ml. of pyridine there is added 15 g. of p-fluorophenyl isothiocyanate. The reaction mixture is allowed to stand 15 hours during which time 3-ethoxy-4-carboxy-4'-fluorothiocarbanilide crystallizes. It is separated by filtering and purified by suspending the solid in 150 ml. of hot dioxane and carefully adding about 10 ml. of water to obtain a solution. The hot solution is further diluted with water to induce crystallization. The crystallized thiocarbanilide melts at 170–171° C.

(C) 3-ETHOXY-4-CARBOXYTHIOCARBANILIDE

To a solution of 15 g. (0.083 m.) of 2-ethoxy-4-amino benzoic acid in 175 ml. of dioxane and 15 ml. of pyridine is added 15 g. (0.11 m.) of phenylisothiocyanate. Some solid precipitates immediately. After 2 hours the mixture is diluted with 300 ml. of ether and the solid then isolated by filtering. This material is crystallized by dissolving it in a minimum amount of dimethylformamide and diluting the solution with water until crystallization begins. The crystalline 3-ethoxy-4-carboxythiocarbanilide thus obtained melts at 175–176° C.

(D) 3-ETHOXY-4-CARBOXY-4'-NITROCARBANILIDE 9 g. (0.055 m.) of 4-nitrophenylisocyanate in 50 ml. of benzene is added to a solution of 9 g. (0.05 m.) of 2-ethoxy-4-amino benzoic acid in 75 ml. of warm dioxane. The resulting solution soon deposits crystals of 3-ethoxy-4-carboxy-4'-nitrocarbanilide. After 1 hour at room temperature, the product is collected, washed with ether and washed with hot absolute alcohol. On drying it melts at 240° C.

(E) 4,4'-DICARBOXY-3,3'-DIMETHOXYCARBANILIDE

Phosgene is bubbled into a stirred suspension of 3 g. of 4-amino-2-methoxy benzoic acid in 75 ml. of benzene over a 30-minute period. The solvent is then allowed to evaporate in an open dish. The solid residue thus obtained is dissolved in dilute ammonium hydroxide and the solution neutralized with acetic acid. The crystalline product is collected and washed with warm ethanol. It is 3,3'-dimethoxy-4,4'-dicarboxycarbanilide, M.P. 236° C. (dec.).

3,3'-diethoxy-4,4'-dicarboxycarbanilide, M.P. 244° C. (dec.), is prepared in the same manner from phosgene and 2-ethoxy-4-amino benzoic acid.

(F) 2-ETHOXY-4-CARBAMIDO BENZOIC ACID 5.4 g. of 2-ethoxy-4-amino benzoic acid are added to a solution of 3 g. of potassium cyanate in 50 ml. of water. The mixture is heated on the steam bath for 10 minutes. Solution results. The solution is neutralized with acetic acid. 2-ethoxy-4-carbamido benzoic acid precipitates. It is separated by filtration and crystallized from dimethylformamide-ether. The pure material melts at 205° C. (dec.).

Example 20

2-ETHOXY-4-GUANIDINO BENZOIC ACID 16.3 g. of methyl-2-ethoxy-4-amino benzoate and 10 g. of ammonium thiocyanate are dissolved with warming in a mixture of 100 ml. of water and 14.6 ml. of 25% hydrochloric acid. The mixture is allowed to stand for 2 hours at room temperature, and then evaporated to dryness in vacuo. The residue thus obtained is recrystallized from aqueous methanol to give essentially pure methyl-2-ethoxy-4-thioureido benzoate.

A solution of 10 g. of methyl-2-ethoxy-4-thioureido benzoate obtained as described above and 7 g. of methyl iodide in 75 ml. of methanol is refluxed for 3 hours. The solution is then concentrated to a syrup in vacuo. On trituration of this residue with ethyl ether, methyl-2-ethoxy-4-S-methylthioureido benzoate hydroiodide crystallizes. 10 g. of this latter substance is heated at 100° C. in 100 ml. of 20% ammonia for 3 hours. On evaporation of 17 most of the ammonia, 2-ethoxy-4-guanidino benzoic acid crystallizes from the concentrate.

Example 21

(A) METHYL-2-ETHOXY-4-METHANESULFONYLAMINO BENZOATE

A cold suspension of 8 g. (0.07 m.) of methane sulfonyl chloride in 25 ml. of pyridine is added to a solution of 9.8 g. (0.05 m.) of methyl-2-ethoxy-4-amino benzoate in 75 ml. of pyridine. The temperature is kept below 25° C. by cooling in an ice bath. After standing 17 hours most of the pyridine is removed at room temperature and the residue partitioned between water and ether. The ether solution, after drying, yields crystals of methyl-2-ethoxy-4-methanesulfonylamino benzoate. The product is recrystallized from benzene to give material having a melting point of 114–115° C.

(B) 2-ETHOXY-4-[4'-ACETAMIDO BENZENESULFONAMIDE]-BENZOIC ACID

To 9.0 g. (0.05 m.) of 2-ethoxy-4-amino benzoic acid in 10 g. of sodium hydroxide and 150 ml. of water there is added 12 g. (0.05 m.) of 4-acetylaminobenzene sulfonyl chloride. The temperature of the mixture rises to about 65° C. After 3 hours the solution is clarified by filtration and acidified with hydrochloric acid. The resulting solid is separated and warmed with 75 ml. of methanol to convert it to a granular solid. It is crystallized from 15 ml. of warm dimethylformamide by the addition of 40 ml. of water to give 2-ethoxy-4-[4'-acetamido benzenesulfonamide]-benzoic acid, M.P. 230–232° C.

(C) METHYL-2-ETHOXY-4-(PHENYLSULFINYL-AMINO)-BENZOATE

A solution of 4 g. of methyl-2-ethoxy-4-amino benzoate in 100 ml. of benzene is cooled in an ice bath while a solution of 2.8 g. of benzenesulfinyl chloride in 50 ml. of benzene is added dropwise with stirring. The reaction mixture is stirred at room temperature for 1 hour, and then concentrated to dryness in vacuo. The crude methyl-2-ethoxy-4-(phenylsulfinylamino)-benzoate is collected and purified by crystallization from aqueous methanol.

Methyl - 2 - methylthio - 4 - (phenylsulfinylamino)-benzoate is obtained by the above procedure using methyl-2-methylthio-4-amino benzoate in place of methyl-2-ethoxy-4-amino benzoate. The crude product is also purified by crystallizing from aqueous methanol.

Example 22

(A) 2-ETHOXY-4-HYDROXYMETHYLAMINO BENZOIC ACID 54 g. of 2-ethoxy-4-amino benzoic acid is shaken at room temperature with 150 ml. of 2 N sodium hydroxide in the presence of 24 ml. of 40% formeldehyde. After 4 hours 180 ml. of methanol is added and the resulting solution added to 7.2 l. of acetone containing enough hydrogen chloride to bring the pH to 5. After standing a short while, 2-ethoxy-4-hydroxymethylamino benzoic acid precipitates. It is separated by filtration, washed with cold acetone and air-dried.

(B) METHYL-2-ETHOXY-4-(β-HYDROXYETHYL-AMINO)-BENZOATE 25 g. of ethylene oxide in 25 ml. of acetone is added to a mixture of 20 g. of methyl-2-ethoxy-4-amino benzoate in 60 ml. of acetone, 20 ml. of water and 5 ml. of acetic acid. The mixture is stirred and heated at 50° C. for 7 hours. It is then concentrated to dryness in vacuo and the residue extracted with 3 x 50 ml. of benzene. The benzene extracts are combined, dried over magnesium sulfate and concentrated to ⅓ volume. The benzene solution is passed through a small column of activated alumina. The column is washed with benzene to elute methyl - 2 - ethoxy - 4 - (β - hydroxyethylamino) - benzoate. The product is further purified by recrystallization from benzene.

Methyl - 2 - methylthio - 4 - (β - hydroxyethylamino)-benzoate is prepared in the same manner from methyl-2-methylthio-4-amino benzoate and ethylene oxide.

(C) METHYL-2-ETHOXY-4-(DI-β-HYDROXYETHYL-AMINO)-BENZOATE

A mixture of 3.6 g. of methyl-2-ethoxy-4-amino benzoate, 4 ml. of ethylene oxide and 4 ml. of 2 N acetic acid is heated in a sealed tube at 100° C. for 6 hours. The excess ethylene oxide is then removed. Methyl-2-ethoxy-4-(di-β-hydroxyethylamino)-benzoate separates as an oil which slowly solidifies. It is purified by crystallization from benzene.

Methyl - 2 - methylthio - 4 - (di - β - hydroxyethylamino)-benzoate is prepared using the same previous procedure with methyl-2-methylthio-4-amino benzoate in place of methyl-2-ethoxy-4-amino benzoate.

(D) 2-ETHOXY-4-(N-[HYDROXYMETHYL]-ACETAMIDO)-BENZOIC ACID

A mixture of 22 g. of 2-ethoxy-4-acetamido benzoic acid, 58 ml. of 2 N potassium hydroxide and 10 ml. of 40% formaldehyde is stirred at room temperature for 30 minutes, and then heated to 80–90° C. until a clear solution is obtained. The solution is cooled and acidified with 6 N hydrochloric acid. The acidified solution is allowed to stand at room temperature for 90 minutes, after which time precipitated 2 - ethoxy - 4 - (N-[hydroxymethyl]-acetamido)-benzoic acid is recovered by filtering.

Example 23

2-ETHOXY-4-CARBOXYMETHYLAMINO BENZOIC ACID

A mixture of 19.5 g. of methyl-2-ethoxy-4-amino benzoate and 11 g. of methyl chloroacetate is heated for 5 hours at 130–140° C. It is then cooled, slurried with ether and filtered. The ether solution is extracted with 0.5 N hydrochloric acid, then dried over magnesium sulfate and evaporated to dryness in vacuo to give a residue of methyl-2-ethoxy-4-carbomethoxy-methylamino benzoate. This is heated under reflux for 4 hours with 25 ml. of 5 N sodium hydroxide. The mixture is then diluted with an equal volume of water, cooled to room temperature and acidified with 2 N hydrochloric acid. 2-ethoxy-4-carboxymethylamino benzoic acid crystallizes and is recovered by filtration.

Example 24

N,N'-ETHYLENE BIS (2-ETHOXY-4-AMINO BENZOIC ACID)

A mixture of 18 g. of 2-ethoxy-4-amino benzoic acid, 10 g. of ethylene dibromide and 100 ml. of ethanol is heated under reflux for 20 hours. The reaction mixture is then concentrated in vacuo to about ½ its volume, and cooled in an ice bath. N,N'-ethylene bis (2-ethoxy-4-amino benzoic acid) precipitates and is isolated by filtration and washing with ice-cold ethanol.

Example 25

(A) 2-ETHOXY-4-PHENACYLAMINO BENZOIC ACID

To a solution of 18 g. of 2-ethoxy-4-amino benzoic acid in 100 ml. of water containing 9 g. of sodium hydroxide there is added an ethereal solution of 20 g. of phenacyl bromide. The resulting mixture is stirred rapidly while the temperature is raised slowly so that the ether evaporates, and then heated at 80° C. for 2 hours. The reaction mixture is cooled to about 20° C. and made acid with dilute aqueous hydrogen chloride. Upon acidification 2-ethoxy-4-phenacylamino benzoic acid precipitates and is obtained by filtration.

(B) SODIUM-(3-ETHOXY-4-CARBOMETHOXYPHENYL-AMINO)-METHANE SULFONATE

To 9 g. of methyl-2-ethoxy-4-amino benzoate in 50 ml. of aqueous ethanol there is added 8 g. of sodium formaldehyde bisulfite in 10 ml. of water. The mixture is stirred at 50° C. for 2 hours and then chilled to give a precipitate of sodium - (3 - ethoxy - 4 - carbomethoxyphenyl-amino)-methane sulfonate. The sulfonate is recovered in purified form by filtering and washing with ethanol.

Example 26

METHYL-2-ETHOXY-4-ACETAMIDO BENZOATE 50 ml. of anhydrous methanol is added very slowly to 16 ml. of 20% fuming sulfuric acid at a temperature below 20° C. To the resulting clear solution there is added, with stirring, 10 g. of p-aminosalicylic acid. The resulting mixture is stirred for 3 hours at 80° C. It is then cooled to room temperature and the pH adjusted to 8–9 with 2.5 N sodium hydroxide solution, holding the temperature below 30° C. The resulting mixture is stirred for 1 hour in an ice bath and the solid methyl p-aminosalicylate removed by filtration. The solid is washed with water and air dried, M.P. 119–121° C.

7 ml. of acetic anhydride is added slowly at 65° C., with stirring, to a solution of 10 g. of methyl p-aminosalicylate in 50 ml. of benzene. The mixture is then refluxed for 1 hour and then allowed to cool to room temperature. It is stirred at room temperature for 1 hour and the solid methyl p-acetylaminosalicylate removed by filtration. The solid is washed with 2 x 10 ml. of benzene, then clurried with 20 ml. of benzene and air dried, M.P. 152–153° C.

25 ml. of an 0.99 N solution of sodium methoxide in methanol is mixed with 5.2 g. of methyl p-acetylaminosalicylate (methyl 2-hydroxy-4-acetylamino benzoate). The resulting mixture is stirred until a white precipitate forms and it becomes very pasty. 3.3 ml. of diethyl sulfate is then added and the resulting mixture warmed to reflux temperature. It is defluxed for 30 minutes. The resulting solution is cooled to about 30° C. and 11.3 ml. of an 0.99 N solution of sodium methoxide in methanol is added. 1.5 ml. of diethyl sulfate is also added and the resulting solution refluxed for 30 minutes. It is then concentrated in vacuo to near dryness and the resulting solid treated with 60 ml. of water. The aqueous mixture is stirred for 15 minutes and filtered. The solid is slurried with 15 ml. of 0.5 N sodium hydroxide solution, washed to neutrality with water and air dried. The product is substantially pure methyl 2-ethoxy-4-acetylamino benzoate.

5 g. of this material in 20 ml. of methanol is mixed with 5 ml. of concentrated sulfuric acid. The solution is refluxed for 5 minutes and then cooled to room temperature and diluted with 40 ml. of water. The pH is then brought to 8 with solid sodium carbonate and the resulting precipitate of methyl 2-ethoxy-4-amino benzoate removed by filtration, washed with water and dried, M.P. 102–103° C.

*Example 27*

(A) 2-ETHOXY-4-ETHYLIDENYLAMINO BENZOIC ACID

To 10 g. of 2-ethoxy-4-amino benzoic acid is added 30 ml. of acetaldehyde. There is an immediate reaction with evolution of heat. The resulting solution is allowed to stand at room temperature until the acetaldehyde evaporates. The resulting crystalline residue is triturated with chloroform, the chloroform decanted and the crystals allowed to dry. The resulting crystalline 2-ethoxy-4-ethylidenylamino benzoic acid melts at 202° C. Its methyl ester is active against *E. maxima* at a level of 0.0005% by weight in the poultry feed.

(B) 2-ETHOXY-4-BUTYLIDENYLAMINO BENZOIC ACID

To a stirred suspension of 20 g. of 2-ethoxy-4-amino benzoic acid in 150 ml. of alcohol is added 16 ml. of n-butyraldehyde. The resulting mixture is stirred and heated on the steam bath for 1 hour and then chilled. The solid product is recovered by filtration and dried, M.P. 173° C. (dec.). The crude solid is extracted with warm 70% alcohol, and the alcohol removed by filtration. The remaining solid 2-ethoxy-4-butylidenylamino benzoic acid is air dried, M.P. 175–176° C. The compound is effective in preventing *E. maxima* infections in poultry when fed at a level of 0.00025% by weight in the feed.

Other 4-loweralkidenylamino compounds having the formula

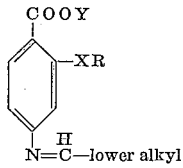

N=C—lower alkyl where X, R and Y have the meanings discussed hereinabove are prepared by reacting the free amino compound with a lower alkyl aldehyde such as acetaldehyde, propionaldehyde, butyraldehyde and isobutyraldehyde. When a lower alkyl ketone, instead of an aldehyde, is reacted with the 4-amino benzoic acid compound, the resulting Schiff base moiety attached to the 4-position of the substituted benzoic acid will have the formula

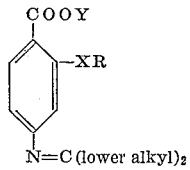

N=C(lower alkyl)$_2$

It is to be understood that foregoing Examples 7–27 consist of methods for making a representative number of the compounds which have now been found to possess a high degree of anticoccidial activity, and that the processes of these examples may be applied to the syntheses of related compounds by substitution of appropriate reactants. For example, other esters, acyl compounds, carbanilides, carbamates and the like are produced from appropriate starting materials by the processes described above. In addition, salts of the free acids are made by known methods by action of a base on the free acid.

Any departure from the above description which conforms to the present invention is intended to be included within the scope of the claims.

What is claimed is:

1. A composition useful in the control of coccidiosis that comprises a poultry feed having dispersed therein from about 0.0001% to about 0.03% by weight of a compound of the formula

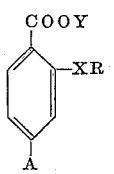

wherein Y is selected from the class consisting of hydrogen, hydrocarbon having less than nine carbon atoms, alkali metal and alkaline earth metal, X is selected from the class consisting of oxygen and sulfur, R is selected from the class consisting of lower alkyl and lower alkenyl, and A is selected from the class consisting of amino, alkylamino where the alkyl group has 1–3 carbon atoms, dialkylamino where the alkyl group has 1–3 carbon atoms, and groups hydrolyzable thereto with acid.

2. A composition useful in the control of coccidiosis that comprises a poultry feedstuff having dispersed therein a minor amount of 2-loweralkoxy-4-amino benzoic acid.

3. A composition useful in the control of coccidiosis that comprises a poultry feedstuff having dispersed therein a minor amount of a hydrocarbon ester of 2-loweralkoxy-4-amino benzoic acid, said hydrocarbon group having less than nine carbon atoms.

4. A composition useful in the control of coccidiosis that comprises a poultry feedstuff having dispersed therein a minor amount of a loweralkyl ester of 2-ethoxy-4-acylamino benzoic acid.

5. A composition useful in the control of coccidiosis that comprises a poultry feedstuff having dispersed therein a minor amount of methyl 2-ethoxy-4-acetamido benzoate.

6. A composition useful in the control of coccidiosis that comprises a poultry feedstuff having dispersed therein a minor amount of ethyl 2-ethoxy-4-benzamido benzoate.

7. A composition useful in the control of coccidiosis that comprises a poultry feedstuff having dispersed therein a minor amount of 2-ethoxy-4-amino benzoic acid.

8. A composition useful in the control of coccidiosis that comprises a poultry feedstuff having dispersed therein from about 0.0001% to about 0.035% by weight of methyl 2-ethoxy-4-acetamido benzoate.

9. A composition useful in the control of coccidiosis that comprises an animal feed having distributed therein at least about 0.00005% by weight of a benzoic acid derivative of the formula

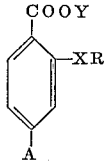

wherein Y is selected from the class consisting of hydrogen, hydrocarbon having less than nine carbon atoms, alkali metal and alkaline earth metal, X is selected from the class consisting of oxygen and sulfur, R is selected from the class consisting of lower alkyl and lower alkenyl, and A is selected from the class consisting of amino, alkylamino where the alkyl group has 1–3 carbon atoms, dialkylamino where the alkyl group has 1–3 carbon atoms, and groups hydrolyzable thereto with acid, and a minor amount of a coccidiostat other than said benzoic acid derivative.

10. A composition useful in the control of coccidiosis that comprises a poultry feedstuff having distributed therein from about 0.0001% to about 0.012% by weight of a benzoic acid derivative of the formula

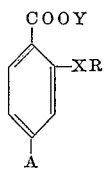

wherein Y is selected from the class consisting of hydrogen, hydrocarbon having less than nine carbon atoms, alkali metal and alkaline earth metal, X is selected from the class consisting of oxygen and sulfur, R is selected from the class consisting of lower alkyl and lower alkenyl, and A is selected from the class consisting of amino, alkylamino where the alkyl group has 1–3 carbon atoms, dialkylamino where the alkyl group has 1–3 carbon atoms, and groups hydrolyzable thereto with acid, and at least about 0.0005% by weight of a coccidiostat other than said benzoic acid derivative.

11. A composition useful in the control of coccidiosis that comprises a poultry feedstuff having dispersed therein from about 0.0001% to 0.001% by weight of loweralkyl 2-ethoxy-4-acylamino benzoate and a second coccidiostat primarily effective against *E. tenella*, the weight ratio of said benzoate to said second coccidiostat being from 1:5 to 1:300.

12. A composition useful in the control of coccidiosis that comprises a poultry feed containing from about 0.0002% to 0.0008% by weight of methyl 2-ethoxy-4-acetamido benzoate and from about 0.004% to 0.025% by weight of amprolium.

13. A composition useful in the control of coccidiosis that comprises a poultry feed containing from about 0.0002% to 0.0008% by weight of methyl 2-ethoxy-4-acetamido benzoate and from about 0.004% to 0.025% by weight of 2-methyl-3,5-dinitrobenzamide.

14. A composition useful for the control of coccidiosis that comprises a mixture of a benzoic acid derivative of the formula

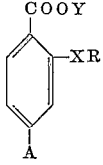

wherein Y is selected from the class consisting of hydrogen, hydrocarbon having less than nine carbon atoms, alkali metal and alkaline earth metal, X is selected from the class consisting of oxygen and sulfur, R is selected from the class consisting of lower alkyl and lower alkenyl, and A is selected from the class consisting of amino, alkylamino where the alkyl group has 1–3 carbon atoms, dialkylamino where the alkyl group has 1–3 carbon atoms, and groups hydrolyzable thereto with acid, and a coccidiostat other than said benzoic acid derivative, the weight ratio of said benzoic acid compound to said other coccidiostat being in the range of 1:5 to 1:300.

15. A composition useful for the control of coccidiosis that comprises a poultry feed additive having dispersed therein a benzoic acid derivative of the formula

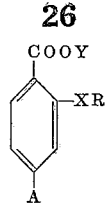

wherein Y is selected from the class consisting of hydrogen, hydrocarbon having less than nine carbon atoms, alkali metal and alkaline earth metal, X is selected from the class consisting of oxygen and sulfur, R is selected from the class consisting of lower alkyl and lower alkenyl, and A is selected from the class consisting of amino, alkylamino where the alkyl group has 1–3 carbon atoms, dialkylamino where the alkyl group has 1–3 carbon atoms, and groups hydrolyzable thereto with acid, and a coccidiostat other than said benzoic acid derivative, the ratio of said active ingredients being such that incorporation of said composition into a poultry feedstuff yields a finished feed containing at least about 0.0001% by weight of said benzoic acid derivative and at least about 0.001% by weight of said other coccidiostat.

16. A composition that comprises a poultry feed additive containing loweralkyl 2-ethoxy-4-acylamino benzoate and a second coccidiostat effective primarily against *E. tenella*, said composition containing from 5–300 parts by weight of said second coccidiostat per part of lower alkyl 2-ethoxy-4-acylamino benzoate.

17. A poultry feed additive containing about 0.4–1.2% by weight of methyl 2-ethoxy-4-acetamido benzoate and 15–30% by weight of amprolium.

18. The method of combating coccidiosis in poultry that comprises orally administering to poultry a mixture of a benzoic acid derivative of the formula

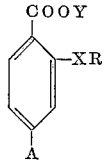

wherein Y is selected from the class consisting of hydrogen, hydrocarbon having less than nine carbon atoms, alkali metal and alkaline earth metal, X is selected from the class consisting of oxygen and sulfur, R is selected from the class consisting of lower alkyl and lower alkenyl, and A is selected from the class consisting of amino, alkylamino where the alkyl group has 1–3 carbon atoms, dialkylamino where the alkyl group has 1–3 carbon atoms, and groups hydrolyzable thereto with acid, and a coccidiostat other than said benzoic acid derivative, the weight ratio of said benzoic acid compound to said other coccidiostat being in the range of 1:5 to 1:300.

19. A composition useful for the control of coccidiosis in poultry that comprises a poultry drinking water formulation having uniformly distributed therein an anticoccidial amount of a loweralkyl 2-lower alkoxy 4-acylamino benzoate and a coccidiostat other than said benzoate compound.

20. A composition for the control of coccidiosis that comprises a poultry feed containing from about 0.0002% to 0.0075% by weight of methyl 2-ethoxy-4-acetamido benzote and from about 0.004% to 0.025% by weight of amprolium.

21. The method fo combating coccidiosis in poultry that comprises orally administering to poultry an anticoccidial amount of a compound having the formula

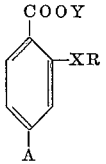

wherein Y is selected from the class consisting of hydrogen, hydrocarbon having less than nine carbon atoms, alkali metal and alkaline earth metal, X is selected from the class consisting of oxygen and sulfur, R is selected from the class consisting of lower alkyl and lower alkenyl, and A is selected from the class consisting of amino, alkylamino where the alkyl group has 1–3 carbon atoms, dialkylamino where the alkyl group has 1–3 carbon atoms and groups hydrolyzable thereto with acid.

References Cited by the Examiner

Clinton: J.A.C.S., vol. 74, Feb. 5, 1952, pages 592–598.
Doub: J.A.C.S., vol. 73, March 1951, pages 903–905.
Stephenson: Veterinary Drug Encyclopedia, Ninth edition, May 1961, pages 14 and 49.
Girard: Chem. Abst., vol. 46, 1952, p. 7591B.

JULIAN S. LEVITT, *Primary Examiner.*

MORRIS O. WOLK, FRANK CACCIAPAGLIA, Jr., LEWIS GOTTS, *Examiners.*